(12) United States Patent
Asada et al.

(10) Patent No.: US 10,988,185 B2
(45) Date of Patent: Apr. 27, 2021

(54) FENDER SUPPORT STRUCTURE AND WORK VEHICLE INCLUDING SAME

(71) Applicant: Kubota Corporation, Osaka (JP)

(72) Inventors: Akihiro Asada, Sakai (JP); Hiroki Isaka, Sakai (JP); Taichi Muramatsu, Sakai (JP); Keisuke Shiiba, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 337 days.

(21) Appl. No.: 16/086,057

(22) PCT Filed: Apr. 26, 2018

(86) PCT No.: PCT/JP2018/017035
§ 371 (c)(1),
(2) Date: Sep. 18, 2018

(87) PCT Pub. No.: WO2019/008885
PCT Pub. Date: Jan. 10, 2019

(65) Prior Publication Data
US 2020/0283073 A1    Sep. 10, 2020

(30) Foreign Application Priority Data

Jul. 1, 2017   (JP) ............................. JP2017-130001
Dec. 7, 2017   (JP) ............................. JP2017-235037

(51) Int. Cl.
*B62D 25/16*    (2006.01)
*B62D 25/18*    (2006.01)
*B62D 49/00*    (2006.01)

(52) U.S. Cl.
CPC ......... *B62D 25/165* (2013.01); *B62D 25/168* (2013.01); *B62D 25/186* (2013.01); *B62D 49/00* (2013.01)

(58) Field of Classification Search
CPC .... B62D 25/16; B62D 25/163; B62D 25/165; B62D 25/168; B62D 25/182; B62D 25/186
See application file for complete search history.

(56) References Cited

U.S. PATENT DOCUMENTS 3,930,380 A * 1/1976 Fogt .......................... F16D 3/72
                                                     464/57
4,097,085 A    6/1978 Nelson
(Continued)

FOREIGN PATENT DOCUMENTS

CN    101898589 A    12/2010
CN    204472915 U    7/2015
(Continued)

OTHER PUBLICATIONS

The extended European Search Report dated Jul. 2, 2020 by the European Patent Office in corresponding European Application No. 18827473.2. (8 pages).
(Continued)

*Primary Examiner* — Frank B Vanaman
(74) *Attorney, Agent, or Firm* — Buchanan Ingersoll & Rooney PC

(57) ABSTRACT

A fender support structure includes a base member that rotates in accordance with a steering of a front wheel, a cover member that is relatively rotatable with respect to the base member and that supports a front wheel fender covering the front wheel, a holding mechanism that is accommodated in the base member and the cover member and that generates a holding force to hold a relative rotational position of the cover member relative to the base member at a predetermined initial position, and a regulating mechanism that regulates a rotation of the cover member in accordance with a steering of the front wheel against the holding force
(Continued)

when a steering angle of the front wheel becomes a predetermined value or more in a left direction and a right direction.

17 Claims, 13 Drawing Sheets

(56) References Cited

U.S. PATENT DOCUMENTS

| | | | | |
|---|---|---|---|---|
| 4,465,171 | A | * | 8/1984 | Koyama ............... F16D 27/105 |
| | | | | 192/110 R |
| 5,074,573 | A | | 12/1991 | Dick |
| 5,511,808 | A | * | 4/1996 | Rowland ............... B62D 25/163 |
| | | | | 280/157 |
| 5,794,956 | A | * | 8/1998 | Hurlburt ............... B62D 25/186 |
| | | | | 280/156 |
| 2007/0273122 | A1 | | 11/2007 | Lodi et al. |
| 2012/0080908 | A1 | | 4/2012 | Wellman et al. |
| 2013/0154228 | A1 | | 6/2013 | Ducroquet |
| 2013/0313389 | A1 | * | 11/2013 | Lodi ................... B62D 25/166 |
| | | | | 248/214 |
| 2013/0326856 | A1 | * | 12/2013 | Pelletier ................... G05G 1/46 |
| | | | | 29/428 |
| 2015/0197287 | A1 | | 7/2015 | Heino |
| 2016/0128278 | A1 | | 5/2016 | Rau et al. |
| 2018/0215417 | A1 | * | 8/2018 | Maier ................... B62D 25/182 |

FOREIGN PATENT DOCUMENTS

| | | |
|---|---|---|
| DE | 3607000 A1 | 9/1987 |
| DE | 20013118 U1 | 10/2000 |
| EP | 0850820 A1 | 7/1998 |
| EP | 1043217 A1 | 10/2000 |
| EP | 1481880 A1 | 12/2004 |
| EP | 2666702 A1 | 11/2013 |
| FR | 2595313 A1 | 9/1987 |
| JP | 2525483 | 11/1992 |
| WO | 2019008885 A1 | 10/2019 |

OTHER PUBLICATIONS

International Search report issued in corresponding International Application No. PCT/JP2018/017035, dated Jun. 19, 2018 (2 pages).

* cited by examiner

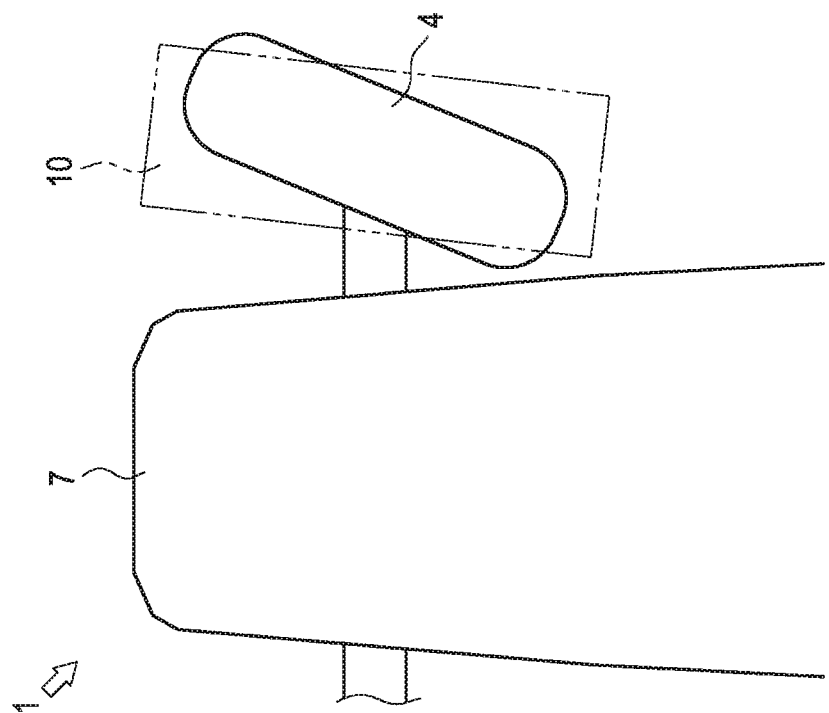
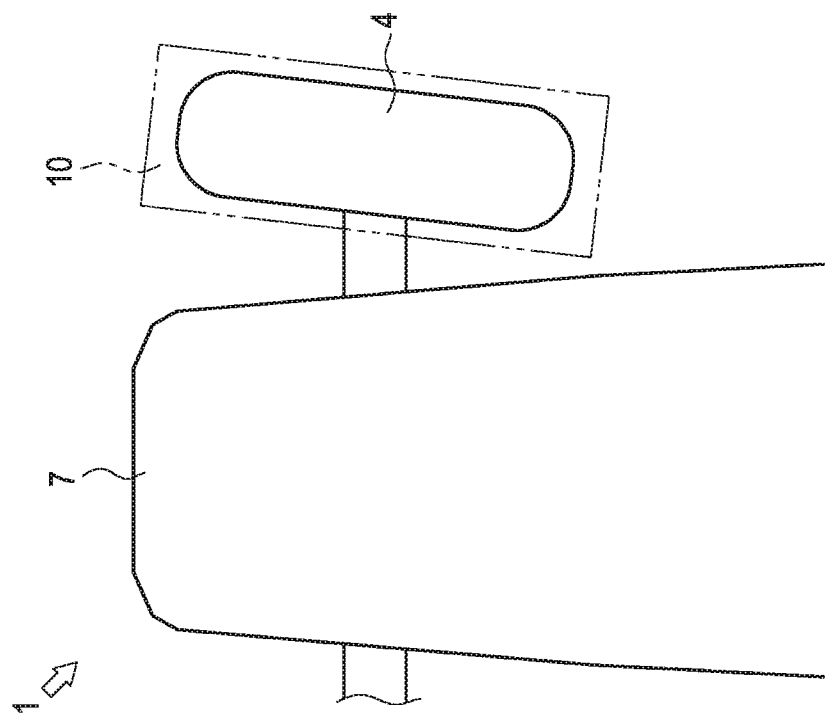

FENDER SUPPORT STRUCTURE AND WORK VEHICLE INCLUDING SAME

TECHNICAL FIELD

The present invention relates to techniques concerning a fender support structure that supports a fender covering a front wheel and a work vehicle including the fender support structure.

BACKGROUND ART

Conventionally, a technique of a fender support structure that supports a fender covering a front wheel is known. For example, the technique is as described in Patent Literature 1.

In the technique described in Patent Literature 1, a technique of fixing a fender covering a front wheel through a stay or the like to an interlocking member interlocking with a steering operation (steering) of a front wheel is disclosed. According to such a configuration, since the fender also rotates in accordance with the steering of the front wheel, it is possible to prevent mud splashes caused by the front wheel even when the front wheel is steered.

However, as in the technique described in Patent Literature 1, if the fender is rotated in accordance with the steering of the front wheel, the fender may interfere with a vehicle body (for example, a hood or the like).

CITATION LIST

Patent Literature

Patent Literature 1: Japanese Registered Utility Model No. 2525483

SUMMARY OF INVENTION

Technical Problem

The present invention has been made in view of the above circumstances, and an object of the present invention is to provide a fender support structure capable of suppressing fender interference caused by a steering of the front wheel to the left and right, and a work vehicle including the fender support structure.

Solution to Problem

The problem to be solved by the present invention is as described above. Next, the means for solving this problem will be explained.

In other words, the fender support structure of the present invention includes a first rotation body that rotates in accordance with a steering of a front wheel, a second rotation body that is relatively rotatable with respect to the first rotation body and that supports a fender covering the front wheel, a holding mechanism that is accommodated in the first rotation body and the second rotation body and that generates a holding force to hold a relative rotational position of the second rotation body relative to the first rotation body at a predetermined initial position, and a regulating mechanism that regulates a rotation of the second rotation body in accordance with a steering of the front wheel against the holding force when a steering angle of the front wheel becomes a predetermined value or more in a left direction and a right direction.

In addition, the fender support structure of the present invention further includes a seal member that seals between the first rotation body and the second rotation body.

In addition, the second rotation body is disposed so as to cover the first rotation body from above and lateral side.

In addition, the holding mechanism includes a torsion spring having a main body wound in a coil shape having an axis substantially parallel to a rotation shaft of the second rotation body and both ends formed so as to protrude radially from the main body, a first fixed portion fixed to the first rotation body and engageable with one of the both ends, and a second fixed portion fixed to the second rotation body and engageable with the other of the both ends.

In addition, the fender support structure of the present invention further includes a protective member that is accommodated in the first rotation body and the second rotation body and that covers the torsion spring from radially outward.

In addition, the first fixed portion and the second fixed portion are formed in a bar shape substantially parallel to the rotation shaft of the second rotation body, and engage with both of the both ends in a state where the second rotation body is in the initial position.

In addition, the both ends are formed so as to protrude radially inward from the main body.

In addition, the both ends are formed so that a gap between the both ends becomes narrow to each other radially inward in a state where the second rotation body is in the initial position when viewed from a axial direction of the rotation shaft of the second rotation body, and the first fixed portion and the second fixed portion are disposed in the gap.

In addition, the first fixed portion and the second fixed portion are formed in a columnar shape extending substantially parallel to the rotation shaft of the second rotation body, and a diameter of one of the first fixed portion and the second fixed portion, which is located radially outward, is larger than a diameter of the other of the first fixed portion and the second fixed portion, which is located radially inward.

In addition, the regulating mechanism is formed so that with reference to a steering angle of the front wheel in a state where a vehicle body travels straight, a steering angle of the front wheel when a front of the front wheel rotates toward an inside of the vehicle body to regulate the second rotation body is larger than a steering angle of the front wheel when a rear of the front wheel rotates toward the inside of the vehicle body to regulate the second rotation body.

In addition, the regulating mechanism includes a first regulating portion that is fixed to the second rotation body and that comes into contact with part of the vehicle body when the front of the front wheel rotates toward the inside of the vehicle body by a predetermined steering angle to regulate a rotation of the second rotation body, and a second regulating portion that is fixed to the second rotation body and that comes into contact with the part when the rear of the front wheel rotates toward the inside of the vehicle body by a predetermined steering angle to regulate a rotation of the second rotation body.

In addition, the regulating mechanism further includes an adjustment mechanism capable of changing fixed positions of the first regulating portion and the second regulating portion with respect to the second rotation body.

In addition, the part is a joint portion of a case of a front axle mechanism that transmits power to the front wheel.

In addition, in a state where a steering angle of the front wheel is set to a steering angle at which the vehicle body travels straight, the first regulating portion is located at a position more distant from the part in a left-right direction than the second regulating portion is.

In addition, the work vehicle of the present invention includes the fender support structure of the present invention.

In addition, the fender is formed so that a front end of the fender is disposed at a position identical to a front end of the front wheel, or forward of the front end of the front wheel in the front and rear direction.

In addition, the fender is formed so as to cover a half of an outer periphery of the front wheel or more.

Advantageous Effects of Invention

The effects of the present invention are as follows.

The fender support structure of the present invention can suppress the fender interference caused by the steering of the front wheel to the left and right. In particular, the fender interference can be suppressed not only when the front wheel is steered in one direction but also when steered in the other direction, so that the degree of freedom of the shape of the fender can be improved. In addition, adhesion of foreign matter to the holding mechanism can be effectively prevented.

In the fender support structure of the present invention, adhesion of foreign matter to the holding mechanism can be effectively prevented.

In the fender support structure of the present invention, intrusion of foreign matter into the first rotation body and the second rotation body can be effectively prevented.

In the fender support structure of the present invention, a holding force can be obtained with a simple configuration.

In the fender support structure of the present invention, it is possible to prevent the torsion spring from interfering with other members.

In the fender support structure of the present invention, a holding force can be obtained with a simple configuration. That is, even if the front wheel is steered to either the left or the right, the first fixed portion and the second fixed portion can be engaged with any one of both ends of the torsion spring to obtain a holding force. In this way, regardless of the steering direction of the front wheel, the holding force can be obtained by the two fixed portions (the first fixed portion and the second fixed portion) and the torsion spring.

In the fender support structure of the present invention, a high holding force can be easily obtained. That is, by forming both ends inside the main body, the diameter of the main body wound in a coil shape can be easily increased. As a result, the restoring force (holding force) of the torsion spring can be easily secured.

In the fender support structure of the present invention, it is easy to engage the first fixed portion and the second fixed portion with both ends of the torsion spring.

In the fender support structure of the present invention, it is possible to appropriately generate a holding force for holding the rotational position of the second rotation body at the initial position.

In the fender support structure of the present invention, the fender can more appropriately follow the front wheel. That is, since the width of the front of the vehicle body (for example, hood) is formed narrower than the width of the rear, in the case where the front of the front wheel rotates toward the inside of the vehicle body, the fender can be closer to the vehicle body, as compared with the case where the rear of the front wheel rotates toward the inside of the vehicle body. Therefore, when the front of the front wheel rotates toward the inside of the vehicle body, by regulating the second rotation body with a larger steering angle, the fender can follow the front wheel in a wide rotation range.

In the fender support structure of the present invention, it is possible to regulate the rotation of the second rotation body with a simple configuration.

In the fender support structure of the present invention, it is possible to optionally change the steering angle of the front wheel at which the rotation of the second rotation body is regulated. As a result, it is possible to perform setting according to the shape of the vehicle body, the work content, and the preference of the operator.

In the fender support structure of the present invention, it is easy to determine a portion with which the first regulating portion and the second regulating portion are in contact. This facilitates adjustment of the positions of the first regulating portion and the second regulating portion.

In the fender support structure of the present invention, the fender can more appropriately follow the front wheel.

In the work vehicle of the present invention, it is possible to suppress the fender interference caused by the steering of the front wheel to the left and right.

In the work vehicle of the present invention, it is possible to effectively suppress mud splashes by the front wheel, in particular, mud splashes at the time of backward traveling.

In the work vehicle of the present invention, it is possible to effectively suppress the mud splashes by the front wheel.

BRIEF DESCRIPTION OF DRAWINGS

FIG. 8(*c*) is a schematic plan view showing the regulating mechanism when the front wheel has been steered in the other direction.

FIG. 9(*b*) is a schematic plan view showing how a front wheel fender is regulated.

FIG. 10(*a*) is a schematic plan view showing a state in which the front wheel has been steered in the other direction. FIG. 10(*b*) is a schematic plan view showing how the front wheel fender is regulated.

FIG. 11(*b*) is a side view showing a second modification of the front wheel fender.

FIG. 12(*b*) is a schematic plan view showing how the front wheel has been steered to the left.

DESCRIPTION OF EMBODIMENT

Figure 1:
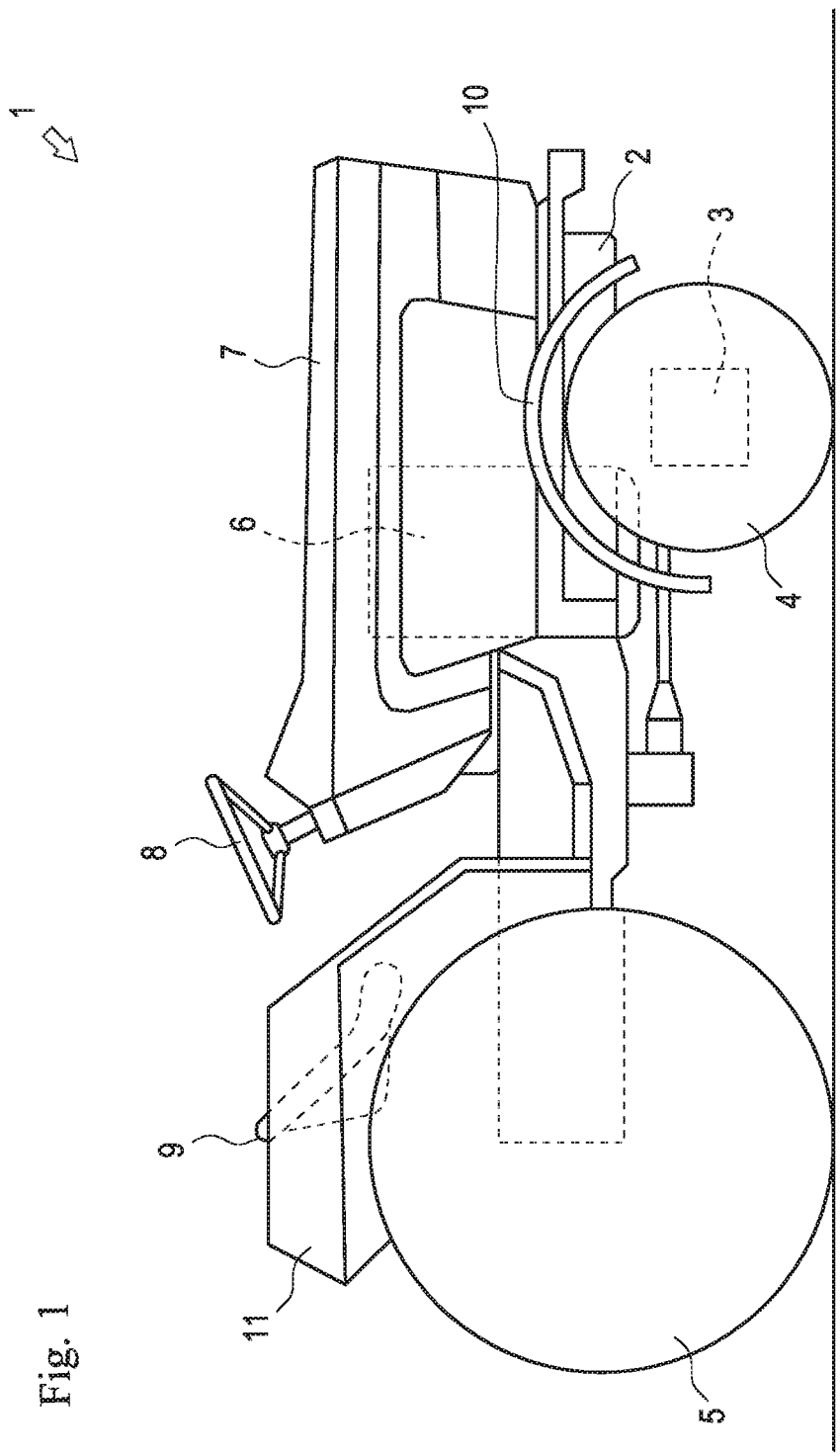
FIG. 1 is a side view showing an overall configuration of a tractor according to an embodiment of the present invention.

First, with reference to FIG. 1, an outline of a tractor 1 provided with a fender support structure 100 according to an embodiment will be described.

The tractor 1 mainly includes a machine frame 2, a front axle mechanism 3, a front wheel 4, a rear wheel 5, an engine 6, a hood 7, a steering wheel 8, a seat 9, a front wheel fender 10, a rear wheel fender 11 and the fender support structure 100.

The machine frame 2 is disposed so that the longitudinal direction of the machine frame 2 is a front and rear direction. The front portion of the machine frame 2 is supported by a pair of left and right front wheels 4 through the front axle mechanism 3. The rear portion of the machine frame 2 is supported by a pair of left and right rear wheels 5 through a rear axle mechanism (not shown). The front wheel 4 is covered by the front wheel fender 10 substantially from above. The rear wheel 5 is covered by the rear wheel fender 11 substantially from above.

The front wheel fender 10 is formed such that the front end thereof is located slightly forward of the front end of the front wheel 4. As a result, it is possible to effectively prevent mud splashes and the like caused by the front wheel 4 when the tractor 1 moves backward (goes backward). The front wheel fender 10 is supported by the fender support structure 100 to be described later.

The engine 6 is provided at the front portion of the machine frame 2. The engine 6 is covered with the hood 7. The power of the engine 6 can be transmitted to the front wheel 4 through the front axle mechanism 3 after speed is changed by an appropriate transmission, and can be transmitted to the rear wheel 5 through the rear axle mechanism. The front wheel 4 and the rear wheel 5 are rotationally driven by the power of the engine 6, and the tractor 1 travels.

From the longitudinally middle portion to the rear portion of the machine frame 2, a driving operation unit having the steering wheel 8, a speed change operation tool (not shown), the seat 9 and the like is provided. The steering wheel 8 can adjust (change) the turning angle of the pair of left and right front wheels 4 according to the rotation operation amount and steer the tractor 1.

Figure 2:
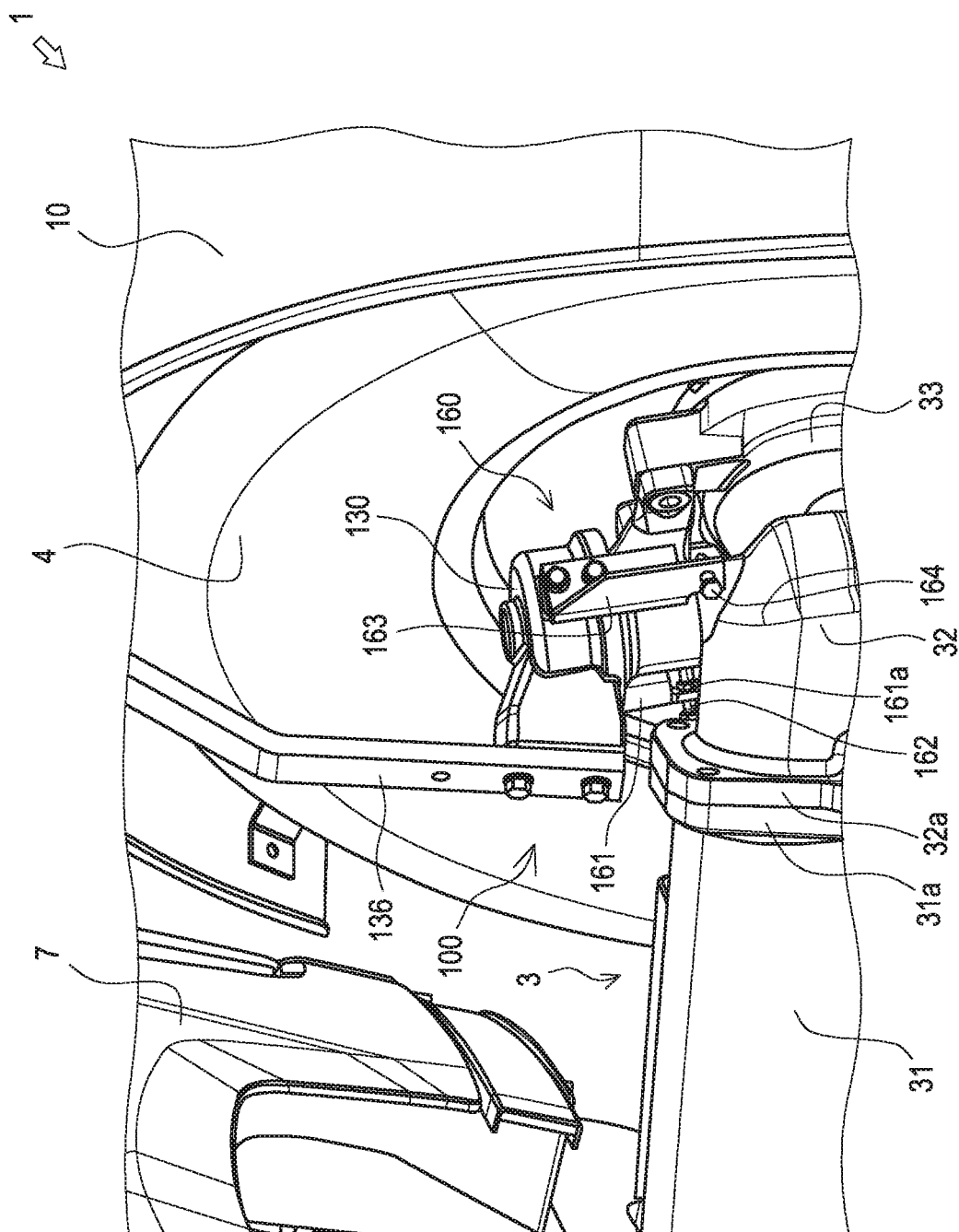
FIG. 2 is a rear perspective view showing a front axle mechanism and a fender support structure.
Figure 3:
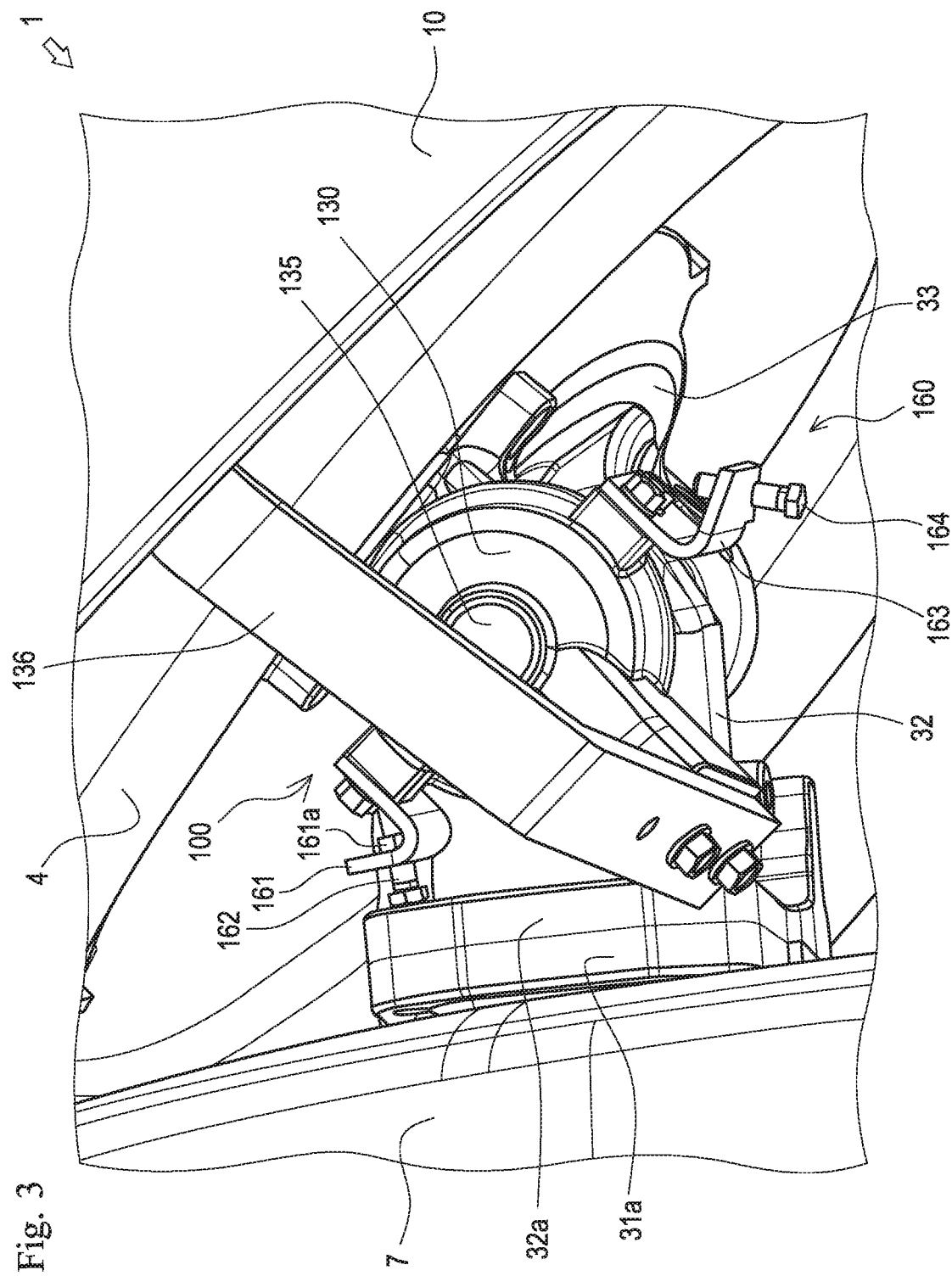
FIG. 3 is an upper perspective view showing the front axle mechanism and the fender support structure.

Next, with reference to FIGS. 2 and 3, the front axle mechanism 3 will be described more specifically. FIGS. 2 and 3 mainly show the right side portion of the front axle mechanism 3 (in the vicinity of the right front wheel 4). The left side portion of the front axle mechanism 3 is also formed substantially similar to the right side portion (substantially symmetrical).

The front axle mechanism 3 transmits the power from the engine 6 to the front wheel 4 and steers the tractor 1 by adjusting the turning angle of the front wheel 4. The front axle mechanism 3 mainly includes a differential case 31, a bevel gear case 32, and a front wheel case 33.

The differential case 31 is a box-shaped member forming the left and right center portion of the front axle mechanism 3. The differential case 31 is disposed so that the longitudinal direction of the differential case 31 is a left-right direction. The differential case 31 is formed in a hollow shape so as to communicate the left and right ends thereof. The center portion of the differential case 31 is swingably connected with respect to the machine frame 2. Flanges 31a are formed at left and right ends of the differential case 31.

The bevel gear case 32 is a box-shaped member formed in a hollow shape. A flange 32a is formed at an inner end (the left end in FIGS. 2 and 3) of the bevel gear case 32. The flange 32a of the bevel gear case 32 is fixed to the flange 31a of the differential case 31 using bolts or the like. In this manner, the differential case 31 and the bevel gear case 32 are joined to each other through the flange 31a and the flange 32a.

The front wheel case 33 is a box-shaped member formed in a hollow shape. The front wheel case 33 is rotatably connected to the bevel gear case 32. More specifically, the front wheel case 33 can rotate to the left and right with respect to the bevel gear case 32 around a rotation shaft directed substantially vertically. A front axle (not shown) is provided on a side portion of the front wheel case 33, and the front wheel 4 is fixed through the front axle.

A steering cylinder (not shown) is connected to the front wheel case 33. When the steering wheel 8 rotates, the steering cylinder expands and contracts according to the rotation operation amount. As a result, the front wheel case 33 rotates with respect to the bevel gear case 32, and eventually the front wheel 4 can be steered.

In addition, members (shaft member, gear, etc.) for transmitting power are disposed inside the differential case 31, the bevel gear case 32, and the front wheel case 33, and the power from the engine 6 is transmitted to the front wheel 4 through the shaft member and the like.

Next, the fender support structure 100 will be described in more detail with reference to FIGS. 2 to 8. Although the fender support structure 100 that supports the right front wheel fender 10 will be described below, the fender support structure 100 that supports the left front wheel fender 10 is configured in the same manner (bilaterally symmetrical with the right fender support structure 100).

The fender support structure 100 supports the front wheel fender 10. The fender support structure 100 mainly includes a base member 110, a rotation shaft 120, a cover member 130, a seal member 140, a holding mechanism 150, and a regulating mechanism 160.

Figure 4:
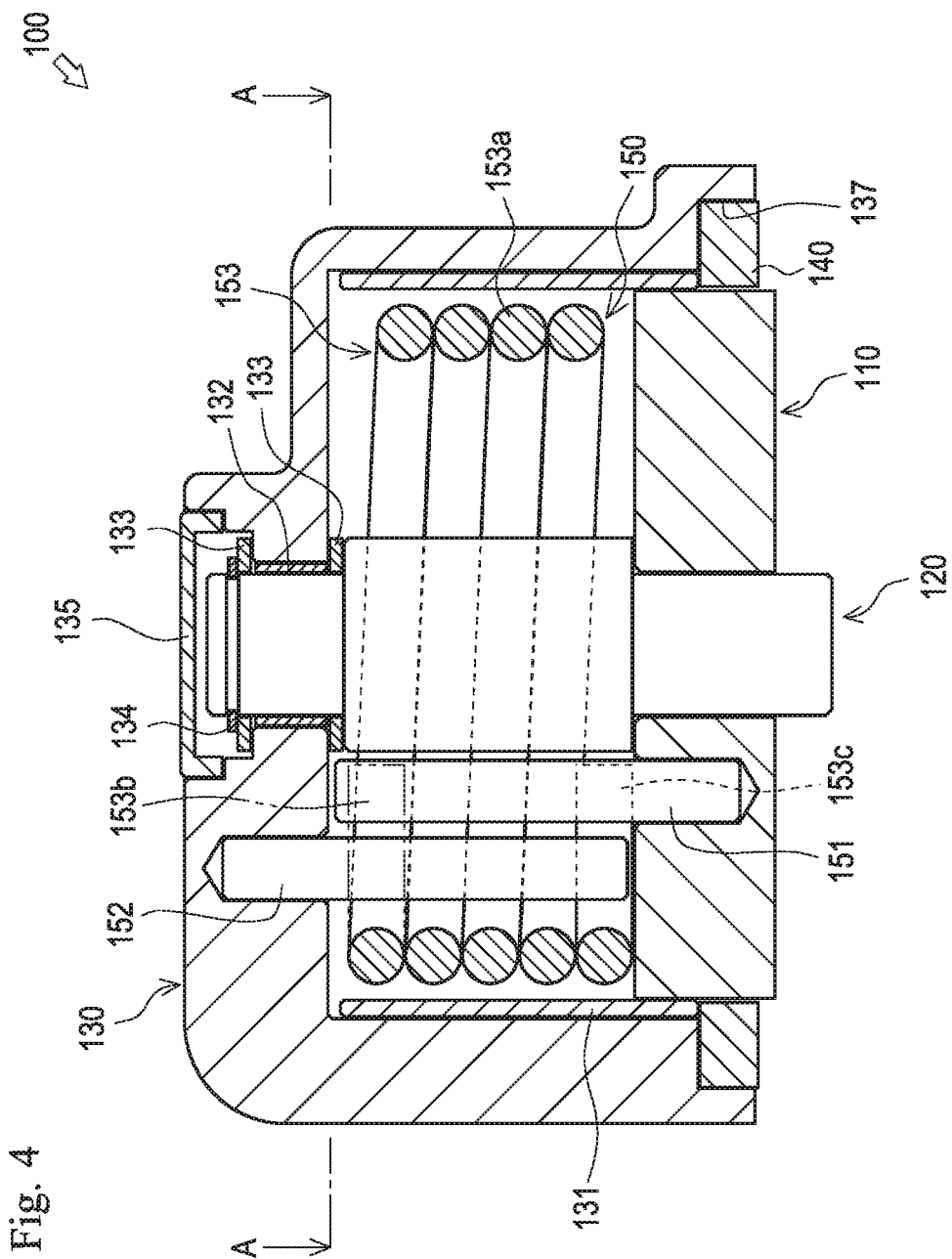
FIG. 4 is a side cross-sectional view showing the fender support structure.
Figure 5:
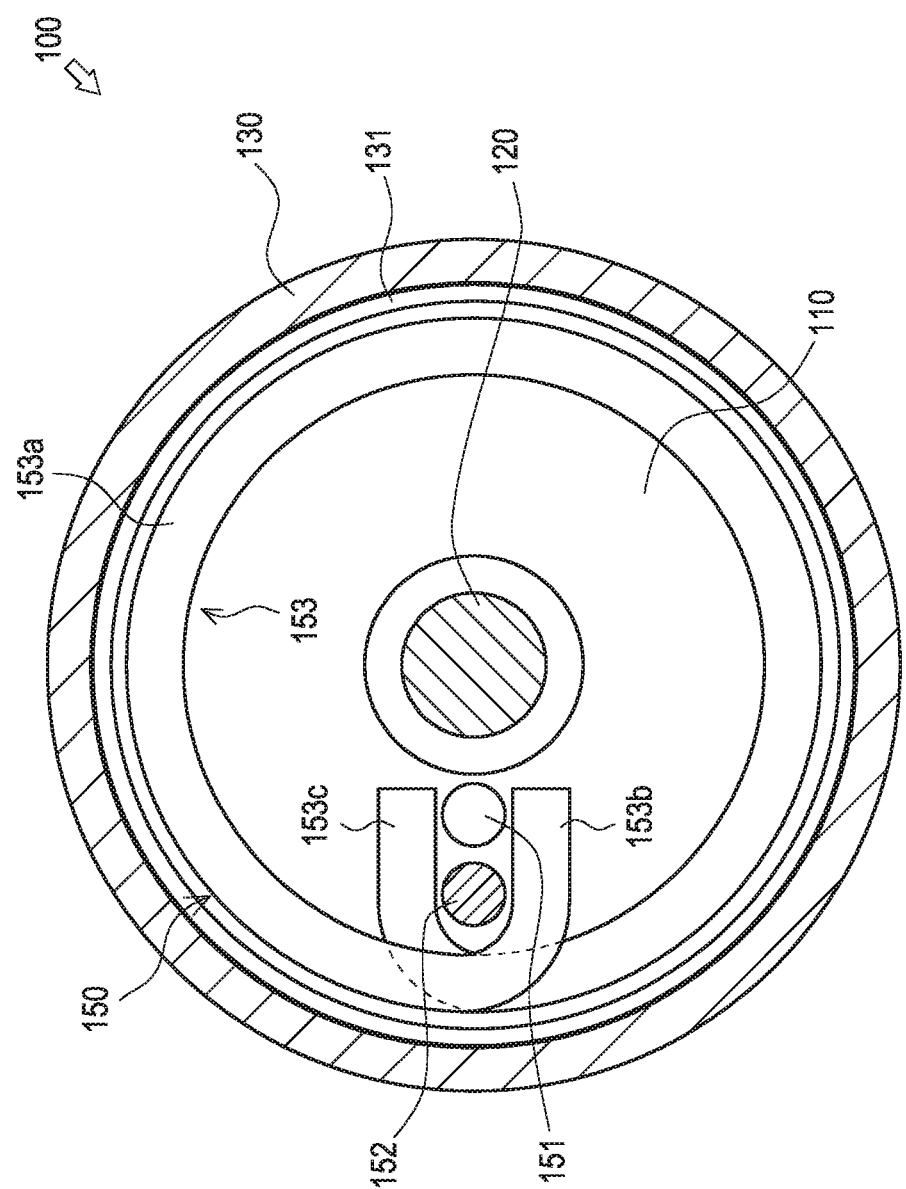
FIG. 5 is a schematic cross-sectional view taken along line A-A.

The base member 110 shown in FIGS. 4 and 5 is a circular plate member. The base member 110 is fixed to the upper portion of the front wheel case 33 (see FIGS. 2 and 3) (on the axis of the rotation shaft of the front wheel case 33). As a result, the base member 110 integrally rotates with the front wheel case 33.

The rotation shaft 120 is a substantially columnar member. The rotation shaft 120 is disposed so that the axis of the rotation shaft 120 is directed substantially vertically. The axis of the rotation shaft 120 is disposed so as to coincide with the axis of the rotation shaft of the front wheel case 33. The vertically middle portion of the rotation shaft 120 is formed so that the diameter of the vertically middle portion is larger than those of the upper and lower ends of the rotation shaft 120. The lower end of the rotation shaft 120 is inserted through a through hole formed in the center portion of the base member 110 and fixed.

The cover member 130 shown in FIGS. 2 to 5 is a box-shaped member formed in a hollow shape. The bottom surface of the cover member 130 is open. The inner surface of the cover member 130 is formed to be a circular shape in a plan cross-sectional view (a circular shape having a diameter slightly larger than the outer diameter of the base member 110). The cover member 130 is disposed so as to cover the base member 110 from above. A first bush 131 is disposed between the inner surface (inner peripheral surface) of the cover member 130 and the outer peripheral surface of the base member 110.

The lower end of the cover member 130 is disposed so as to cover the base member 110 from the side (radially outward). Accordingly, the cover member 130 can cover the base member 110 from the side and from above. The first bush 131 is formed in a substantially cylindrical shape. The first bush 131 is disposed in a state where the axis of the first bush 131 is directed substantially vertically. The first bush 131 is disposed along the inner surface (inner peripheral surface) of the cover member 130. The first bush 131 is disposed so as to extend from the vicinity of the upper end of the inner surface of the cover member 130 to the vicinity of the lower end thereof. The lower end of the first bush 131 is disposed between the inner surface (inner peripheral surface) of the cover member 130 and the outer peripheral surface of the base member 110.

A through hole is formed in the upper surface of the cover member 130, and the upper end of the rotation shaft 120 is inserted into the through hole. A second bush 132 is disposed between the inner peripheral surface of the through hole and the outer peripheral surface of the rotation shaft 120. Thrust collars 133 are provided above and below the second bush 132. In addition, a snap ring 134 is provided on the rotation shaft 120 immediately above the upper thrust collar 133. In addition, the through hole of the cover member 130 is closed from above by a lid member 135.

As shown in FIGS. 2 and 3, a fender bracket 136 is fixed to the outer surface of the cover member 130. The fender bracket 136 is formed so as to extend substantially upward from the cover member 130. The upper end of the fender bracket 136 is fixed to the front wheel fender 10. In this manner, the front wheel fender 10 is supported by the cover member 130 through the fender bracket 136.

The cover member 130 configured as described above can rotate relative to the base member 110 about the rotation shaft 120.

The seal member 140 shown in FIG. 4 prevents intrusion of foreign matter (water, mud, dust, etc.) into the cover member 130. The seal member 140 is provided at the lower end of the inner peripheral surface of the cover member 130. As a result, the seal member 140 can fill the gap between the inner peripheral surface of the cover member 130 and the outer peripheral surface of the base member 110.

More specifically, a recess 137 is formed on the inner surface (inner peripheral surface) of the cover member 130. The recess 137 is formed so as to expand the lower end of the inner surface (inner peripheral surface) of the cover member 130 radially outward. The seal member 140 is formed in an annular shape. The seal member 140 is fitted and fixed to the recess 137 of the cover member 130. The seal member 140 is disposed immediately below the first bush 131. The inner peripheral surface of the seal member 140 is in contact with the base member 110. As a result, the seal member 140 can seal between the cover member 130 and the base member 1100.

The holding mechanism 150 shown in FIGS. 4 and 5 generates a holding force to hold the rotational position of the cover member 130 relative to the base member 110 at a predetermined initial position. The holding mechanism 150 is accommodated in the interior of the cover member 130. The holding mechanism 150 mainly includes a first fixed shaft 151, a second fixed shaft 152, and a torsion spring 153.

The first fixed shaft 151 is a columnar member. The first fixed shaft 151 is disposed in a state where the axis of the first fixed shaft 151 is directed substantially vertically. The first fixed shaft 151 is disposed so as to be radially adjacent to the rotation shaft 120. The lower end of the first fixed shaft 151 is press-fitted and fixed to the base member 110.

The second fixed shaft 152 is a columnar member formed in the same shape as the first fixed shaft 151. The second fixed shaft 152 is disposed in a state where the axis of the second fixed shaft 152 is directed substantially vertically. The second fixed shaft 152 is disposed radially adjacent to the first fixed shaft 151 (radially outward of the first fixed shaft 151). The upper end of the second fixed shaft 152 is press-fitted and fixed to the cover member 130.

The first fixed shaft 151 and the second fixed shaft 152 are disposed so as to extend substantially in parallel with the rotation shaft 120. That is, the first fixed shaft 151 and the second fixed shaft 152 are disposed in parallel to each other. By disposing in this way, space saving (compactness) of the holding mechanism 150 can be easily achieved.

The torsion spring 153 is a coil spring formed by appropriately bending an element wire. The torsion spring 153 mainly includes a main body 153a, an upper end 153b, and a lower end 153c.

The main body 153a is formed by winding an element wire in a coil shape. The outer diameter of the main body 153a is formed to be slightly smaller than the inner diameter of the inner peripheral surface of the cover member 130. The main body 153a is disposed so as to surround the rotation shaft 120 from the outside in a state where the axis is directed substantially vertically (substantially parallel to the axis of the rotation shaft 120).

The upper end 153b is formed by bending one end (upper end) of the element wire radially inward. Accordingly, the upper end 153b is formed so as to protrude radially inward from the main body 153a. The upper end 153b is formed so as to extend from the main body 153a to the vicinity of the rotation shaft 120 radially.

The lower end 153c is formed by bending the other end (lower end) of the element wire radially inward. Accordingly, the lower end 153c is formed so as to protrude radially inward from the main body 153a. The lower end 153c is formed so as to extend from the main body 153a to the vicinity of the rotation shaft 120 radially.

Here, in a state where no external force is applied to the torsion spring 153, the upper end 153b and the lower end 153c are formed so as to extend substantially in parallel in plan view (see FIG. 5). In addition, in plan view, a certain gap is formed between the upper end 153b and the lower end 153c. The width of the gap is formed to be substantially equal to the outer diameter of the first fixed shaft 151 and the second fixed shaft 152. The torsion spring 153 is disposed so that the first fixed shaft 151 and the second fixed shaft 152 are located in the gap. The rotational position of the cover member 130 with respect to the base member 110 in this state is referred to as the "initial position" of the cover member 130. When the cover member 130 is in the initial position, the first fixed shaft 151 and the second fixed shaft 152 are engaged with the upper end 153b and the lower end 153c so as to be sandwiched between the upper end 153b and the lower end 153c.

In this manner, the holding mechanism 150 is accommodated in the interior of the cover member 130 (a space surrounded by the base member 110 and the cover member 130). Further, the space in which the holding mechanism 150 is accommodated is sealed by the seal member 140, and entry of foreign matter from the outside is prevented.

By the holding mechanism 150 configured as described above, a holding force is generated to hold the rotational position of the cover member 130 at the initial position (see FIG. 5).

Figure 6:
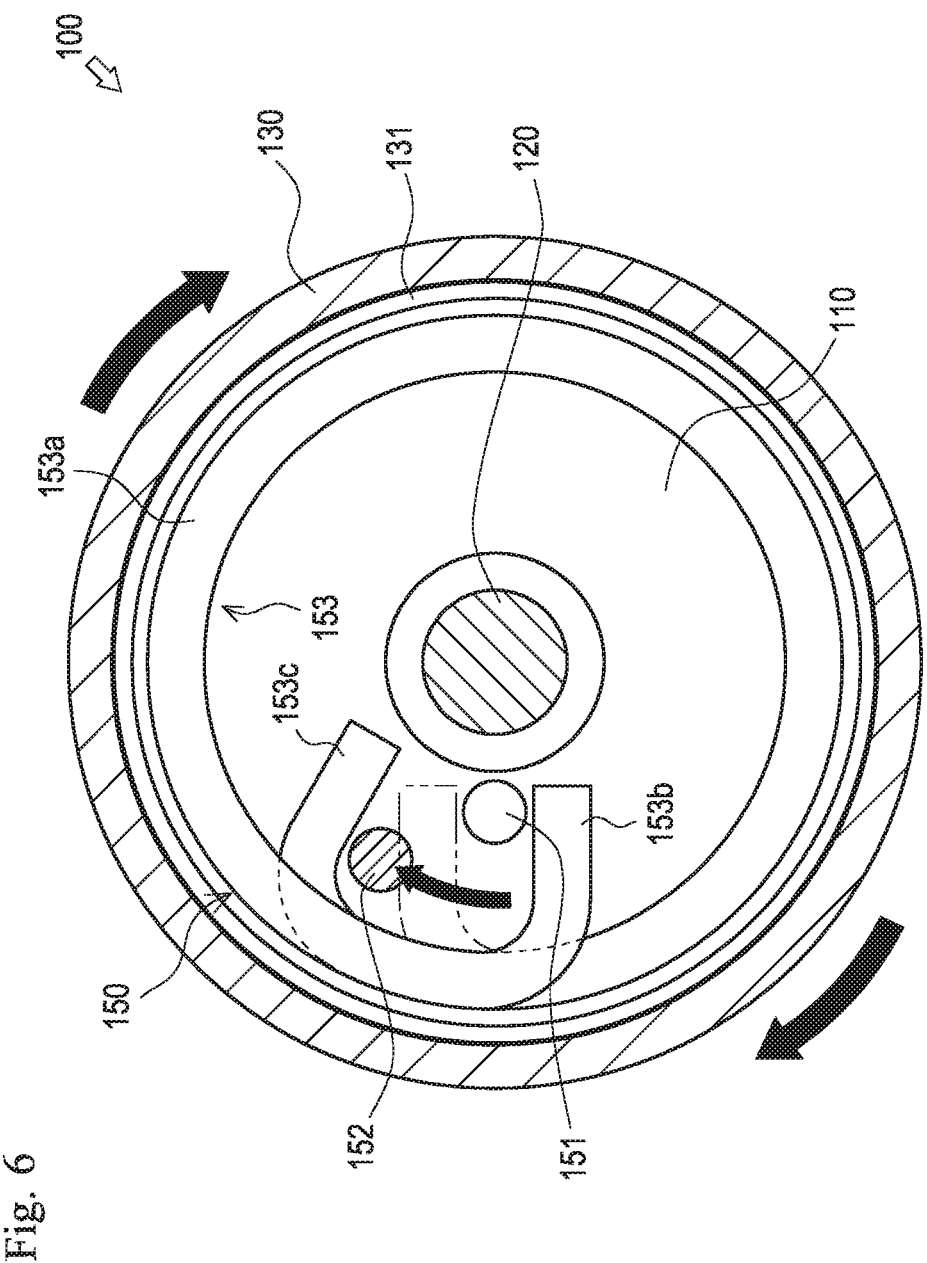
FIG. 6 is a schematic plan cross-sectional view showing a state in which a cover member has rotated in one direction.

For example, as shown in FIG. 6, when the cover member 130 rotates clockwise in plan view with respect to the base member 110, the second fixed shaft 152 fixed to the cover member 130 also rotates around the rotation shaft 120 clockwise in plan view. Then, the second fixed shaft 152 engages with the lower end 153c of the torsion spring 153, and the lower end 153c also rotates clockwise in plan view. On the other hand, the upper end 153b of the torsion spring 153 engages with the first fixed shaft 151, and does not rotate from that position. Accordingly, since the torsion spring 153 is twisted, a restoring force (holding force) for returning the second fixed shaft 152 to the original position (initial position) is generated by the urging force of the torsion spring 153.

At this time, the main body 153a of the torsion spring 153 is twisted by the first fixed shaft 151 and the second fixed shaft 152, thereby reducing the diameter. However, the main body 153a is disposed along the vicinity of the inner peripheral surface of the cover member 130, and a space is secured inside the main body 153a. Therefore, even if the diameter of the main body 153a is small, the main body 153a does not interfere with other members or the like.

By disposing the main body 153a near the inner peripheral surface of the cover member 130 in this way, it is possible to make it difficult for the main body 153a to interfere with other members when the main body 153a is twisted. As a result, it is possible to secure a large relative rotation amount (movable range) of the cover member 130 with respect to the base member 110.

Further, the first bush 131 is provided on the inner peripheral surface of the cover member 130. It is possible to prevent the torsion spring 153 from interfering with the cover member 130 by the first bush 131. This makes it possible to prevent the cover member 130 and the torsion spring 153 from being deformed or damaged.

Figure 7:
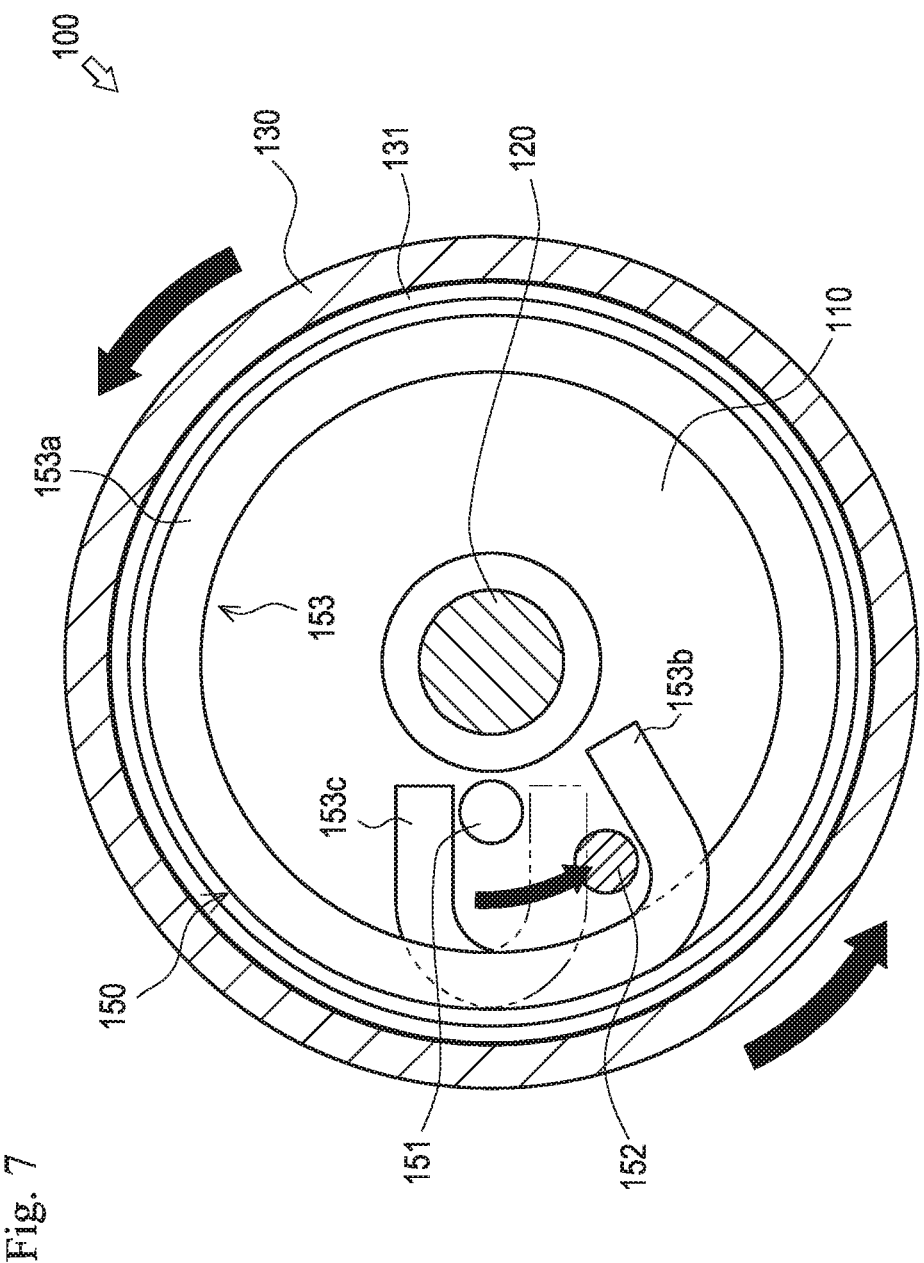
FIG. 7 is a schematic plan cross-sectional view showing a state in which the cover member has rotated in the other direction.

In addition, as shown in FIG. 7, when the cover member 130 rotates counterclockwise in plan view with respect to the base member 110, the second fixed shaft 152 fixed to the cover member 130 also rotates about the rotation shaft 120 counterclockwise in plan view. Then, the second fixed shaft 152 engages with the upper end 153b of the torsion spring 153, and the upper end 153b also rotates counterclockwise in plan view. On the other hand, the lower end 153c of the torsion spring 153 engages with the first fixed shaft 151 and does not rotate from that position. Accordingly, since the torsion spring 153 is twisted, a restoring force (holding force) for returning the second fixed shaft 152 to the original position (initial position) is generated by the urging force of the torsion spring 153.

As described above, when the cover member 130 is to rotate with respect to the base member 110, the first fixed shaft 151 and the second fixed shaft 152 are respectively engaged with both ends (the upper end 153b and the lower end 153c) of the torsion spring 153, so that a holding force is generated to hold the cover member 130 at the initial position. Therefore, basically, the base member 110 and the cover member 130 do not rotate relatively to each other, and when the base member 110 rotates in accordance with the steering of the front wheel 4, the cover member 130 and the base member 110 rotate integrally.

The regulating mechanism 160 shown in FIGS. 2, 3, and 8 regulates the rotation of the cover member 130 in accordance with the rotation of the base member 110. The regulating mechanism 160 mainly includes a front stay 161, a front regulating portion 162, a rear stay 163, and a rear regulating portion 164.

The front stay 161 is a substantially plate-shaped member. The front stay 161 is fixed to the front end portion of the cover member 130. The left end of the front stay 161 is bent forward. A through hole (not shown) for inserting the front regulating portion 162 to be described later is formed in the left end (a portion bent toward the front) of the front stay 161, and a front nut 161a is fixed to a position corresponding to the through hole.

The front regulating portion 162 protrudes to the left from the front stay 161. The front regulating portion 162 is fixed to the left end (a portion bent toward the front) of the front stay 161. The front regulating portion 162 is formed by bolts. The front regulating portion 162 (bolt) is inserted through the through hole formed at the left end of the front stay 161 and fastened to the front nut 161a, whereby the front regulating portion 162 is fixed to the front stay 161. At this time, by changing the amount of tightening of the front regulating portion 162 to the front nut 161a, the position of the front regulating portion 162 (fixed position with respect to the cover member 130) can be optionally adjusted.

The rear stay 163 is a substantially plate-shaped member. The rear stay 163 is fixed to the rear end of the cover member 130. The left end of the rear stay 163 is bent backward. A through hole (not shown) for inserting the rear regulating portion 164 to be described later is formed in the left end (a portion bent backward) of the rear stay 163, and a rear nut 163a is fixed to a position corresponding to the through hole.

The rear regulating portion 164 protrudes to the left from the rear stay 163. The rear regulating portion 164 is fixed to the left end (a portion bent backward) of the rear stay 163. Similarly to the front regulating portion 162, the rear regulating portion 164 is formed by bolts. The rear regulating portion 164 (bolt) is inserted through the through hole formed at the left end of the rear stay 163 and fastened to the rear nut 163a, whereby the rear regulating portion 164 is fixed to the rear stay 163. At this time, by changing the amount of tightening of the rear regulating portion 164 to the rear nut 163a, it is possible to optionally adjust the position of the rear regulating portion 164 (fixed position with respect to the cover member 130).

Figure 8A:
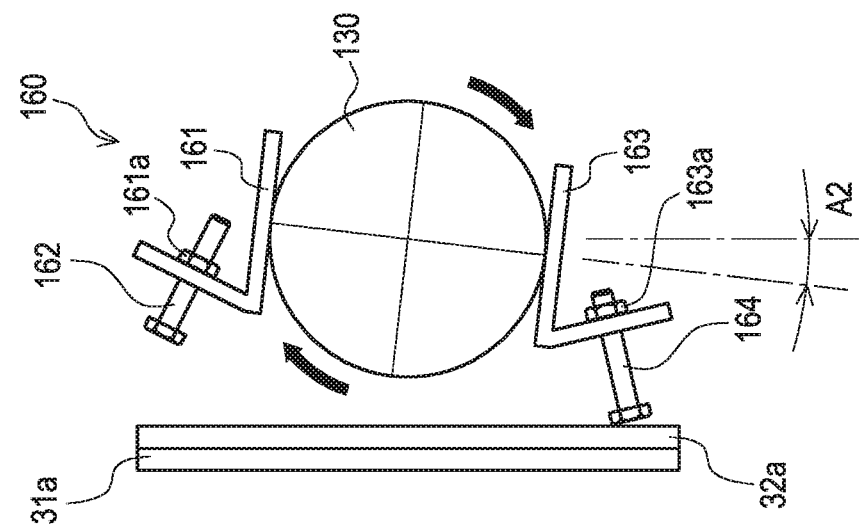
FIG. 8(*a*) is a schematic plan view showing a regulating mechanism FIG. 8(*b*) is a schematic plan view showing the regulating mechanism when a front wheel has been steered in one direction.

In a state where the steering angle of the front wheel 4 is adjusted so that the tractor 1 travels straight, as shown in FIG. 8(a), the front stay 161 and the rear stay 163 are formed to be substantially symmetrical in the front and rear direction. Further, the front regulating portion 162 and the rear regulating portion 164 are disposed so that, in this state, the distance x1 between the flange 32a and the front regulating portion 162 is larger than the distance x2 between the flange 32a and the rear regulating portion 164 (that is, so that the front regulating portion 162 is located at a position more distant from the flange 32a than the rear regulating portion 164 is).

The regulating mechanism 160 configured as described above regulates the rotation of the cover member 130 due to the rotation of the base member 110.

Hereinafter, the manner in which the rotation of the front wheel fender 10 is regulated by the fender support structure 100 configured as described above will be described.

Figure 8B:
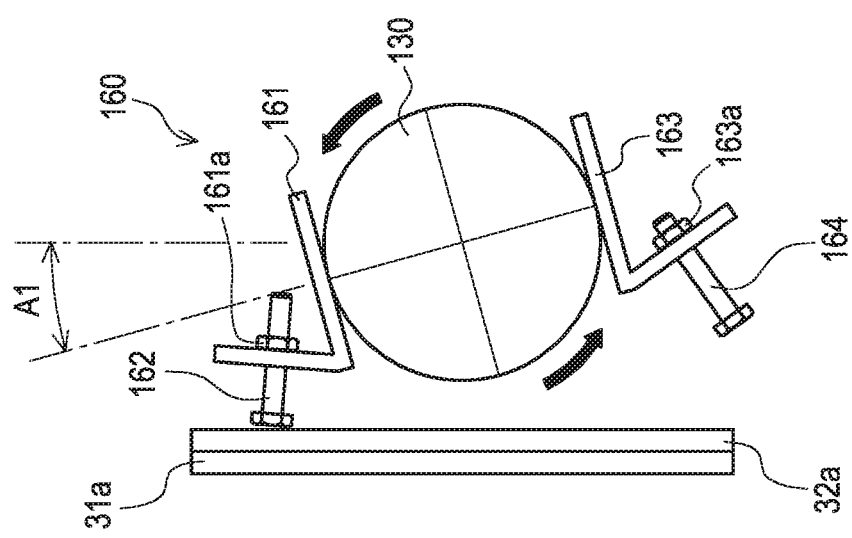
Figure 9A:
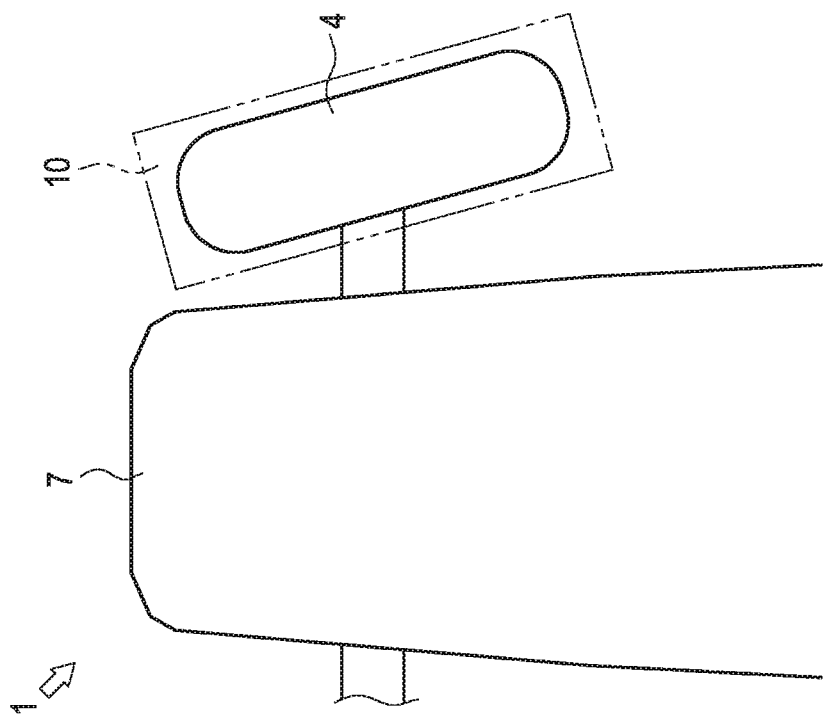
FIG. 9(*a*) is a schematic plan view showing a state in which the front wheel has been steered in one direction.

As shown in FIGS. 8(b) and 9(a), when the front wheel 4 are steered leftward (so that the front of the front wheel 4 is directed toward the inside of the vehicle body of the tractor 1), the cover member 130 as well as the base member 110 are also rotated leftward (counterclockwise in plan view). Therefore, the front wheel fender 10 supported by the cover member 130 also rotates in accordance with the steering of the front wheel 4. Then, when the steering angle of the front wheel 4 to the left reaches a predetermined value (steering angle A1), the front regulating portion 162 comes into contact with the flange 32a. As a result, the rotation of the cover member 130 is regulated.

When the front wheel 4 is further steered to the left from a state where the front regulating portion 162 is in contact with the flange 32a, although the base member 110 rotates to the left, the cover member 130 is regulated by the front regulating portion 162 and cannot rotate. Therefore, the cover member 130 does not rotate, and only the base member 110 rotates in accordance with the steering of the front wheel 4. In this state, when viewed relatively, the cover member 130 rotates clockwise in plan view relative to the base member 110 (see FIG. 6). In this manner, the rotation of the cover member 130 is regulated by the front regulating portion 162 against the holding force of the holding mechanism 150.

Figure 9B:
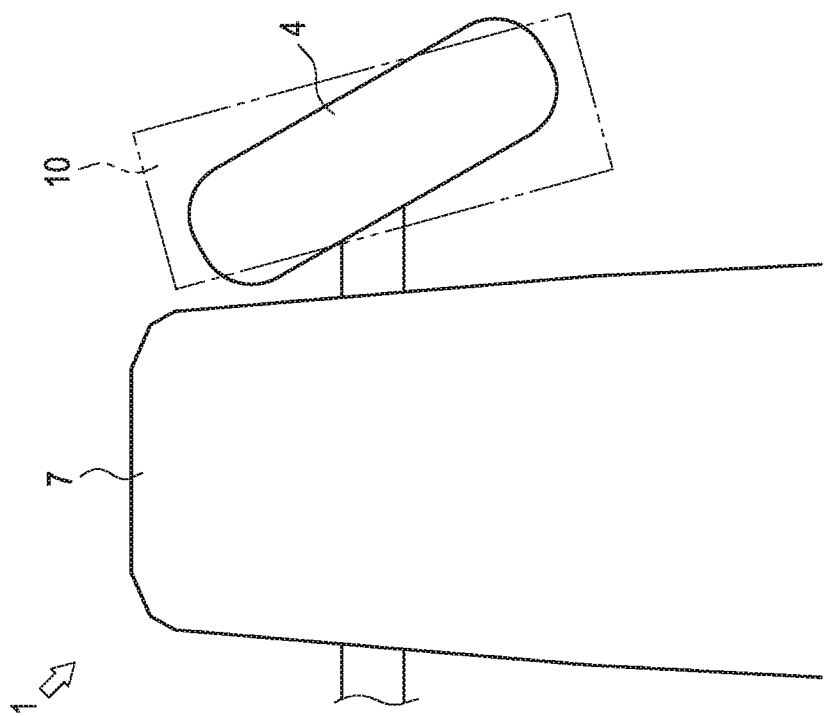

In this way, in a state where the front regulating portion 162 is in contact with the flange 32a, the front wheel fender 10 does not rotate and only the front wheel 4 is steered to the left (see FIG. 9(b)). As described above, since the rotation of the front wheel fender 10 is regulated at the predetermined steering angle A1, interference of the front wheel fender 10 with a vehicle body (hood 7 and the like) of the tractor 1 can be suppressed. In particular, in the present embodiment, since the front end of the front wheel fender 10 is formed to be located forward of the front end of the front wheel 4, when the front wheel 4 is steered to the left, the front wheel fender 10 is easy to interfere with the hood 7. Therefore, the fender support structure 100 (configuration for restricting the rotation of the front wheel fender 10) as in the present embodiment is particularly useful.

Figure 8C:
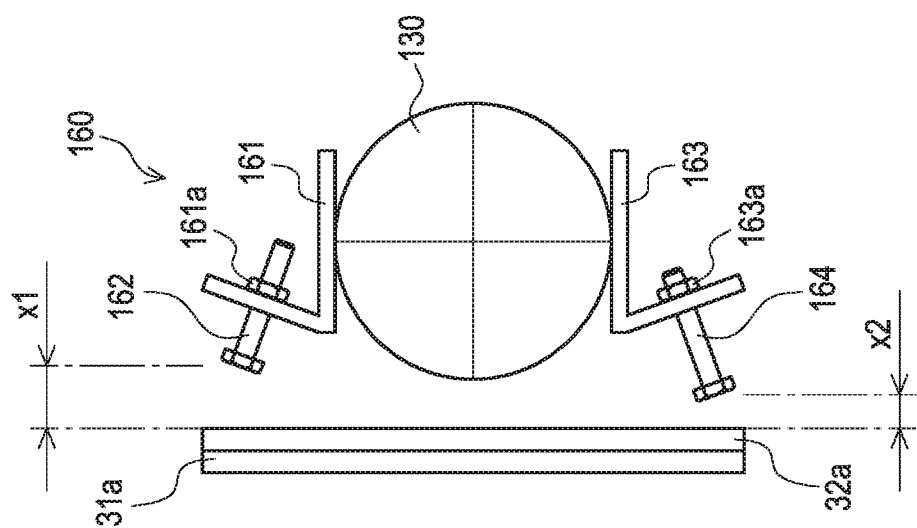

In addition, as shown in FIGS. 8(c) and 10(a), when the front wheel 4 are steered to the right (so that the front of the front wheel 4 is directed to the outside of the vehicle body of the tractor 1), the cover member 130 as well as the base member 110 is also rotated leftward (clockwise in plan view). Therefore, the front wheel fender 10 supported by the cover member 130 also rotates in accordance with the steering of the front wheel 4. Then, when the steering angle of the front wheel 4 to the right reaches a predetermined value (steering angle A2), the rear regulating portion 164 comes into contact with the flange 32a. As a result, the rotation of the cover member 130 is regulated.

When the front wheel 4 is further steered to the right from a state where the rear regulating portion 164 is in contact with the flange 32a, although the base member 110 rotates to the right, the cover member 130 is regulated by the rear regulating portion 164 and cannot rotate. Therefore, the cover member 130 does not rotate, and only the base member 110 rotates in accordance with the steering of the front wheel 4. In this state, when viewed relatively, the cover member 130 rotates counterclockwise in plan view with respect to the base member 110 (see FIG. 7). In this manner, the rotation of the cover member 130 is regulated by the front regulating portion 162 against the holding force of the holding mechanism 150.

In this way, in a state where the rear regulating portion 164 is in contact with the flange 32a, the front wheel fender 10 does not rotate and only the front wheel 4 is steered to the right (see FIG. 10(b)). In this way, since the rotation of the front wheel fender 10 is regulated at the predetermined steering angle A2, interference of the front wheel fender 10 with the vehicle body (hood 7 and the like) of the tractor 1 can be suppressed.

In addition, as shown in FIG. 8(a), since the front regulating portion 162 is configured to be located at a position more distant from the flange 32a than the rear regulating portion 164 is, the steering angle A1 (see FIG. 8(b)) is larger than the steering angle A2 (see FIG. 8(c)). That is, the steering angle A1 at which the rotation of the front wheel fender 10 is regulated when the front wheel 4 is steered to the left, is set to be larger than the steering angle A2 at which the rotation of the front wheel fender 10 is regulated when the front wheel 4 is steered to the right. As a result, it is possible to appropriately regulate the rotation of the front wheel fender 10 according to the shape of the vehicle body of the tractor 1 (in particular, the shape of the hood 7).

That is, in general, the hood 7 is formed in a sharp shape (a shape in which the lateral width narrows toward the front). Therefore, in the case of rotating to the left, as compared with the case of rotating the front wheel fender 10 to the right, the front wheel fender 10 and the hood 7 are harder to interfere with each other, so that it is possible to ensure a large rotation angle. Accordingly, by setting the steering angle A1 to be larger than the steering angle A2, it is possible to make the front wheel fender 10 follow the front wheel 4 as much as possible while preventing the interference between the front wheel fender 10 and the hood 7, and the mud splashes and the like caused by the front wheel 4 can be effectively prevented.

Since the fender support structure 100 that supports the left front wheel fender 10 is also configured similarly (bilaterally symmetrical with the right fender support structure 100), similarly, it is possible to effectively prevent mud splashes and the like caused by the front wheel 4.

As described above, the fender support structure 100 according to the present embodiment includes the base member 110 (first rotation body) that rotates in accordance with a steering of the front wheel 4, the cover member 130 (second rotation body) that is relatively rotatable with respect to the base member 110 and that supports the front wheel fender 10 (fender) covering the front wheel 4, the holding mechanism 150 that is accommodated in the base member 110 and the cover member 130 and that generates a holding force to hold a relative rotational position of the cover member 130 relative to the base member 110 at a predetermined initial position, and the regulating mechanism 160 that regulates a rotation of the cover member 130 in accordance with a steering of the front wheel 4 against the holding force when a steering angle of the front wheel 4 becomes a predetermined value or more in a left direction and a right direction.

With such a configuration, interference of the front wheel fender 10 accompanying the steering of the front wheel 4 to the left and right can be suppressed. In particular, the interference of the front wheel fender 10 can be suppressed not only when the front wheel 4 is steered in one direction but also when steered in the other direction, so that the degree of freedom of the shape of the front wheel fender 10 can be improved.

In addition, by accommodating the holding mechanism 150 in the base member 110 and the cover member 130, foreign matter (water, mud, dust, etc.) can be prevented from adhering to the holding mechanism 150, eventually preventing troubles from occurring.

In addition, the fender support structure 100 further includes the seal member 140 that seals between the base member 110 and the cover member 130.

With such a configuration, it is possible to prevent foreign matter from intruding into the holding mechanism 150 and the base member 110, and it is possible to effectively prevent foreign matter from adhering to the holding mechanism 150.

In addition, the cover member 130 is disposed so as to cover the base member 110 from above and lateral side.

With such a configuration, it is possible to prevent foreign matter from accumulating on the upper surface of the base member 110, and it is possible to effectively prevent foreign matter from intruding into the holding mechanism 150 and the base member 110.

In addition, the holding mechanism 150 includes the torsion spring 153 having the main body 153a wound in a coil shape having an axis substantially parallel to the rotation shaft 120 of the cover member 130 and both ends (upper end 153b and lower end 153c) formed so as to protrude radially from the main body 153a, the first fixed shaft 151 (first fixed portion) fixed to the base member 110 and engageable with one of the both ends, and the second fixed shaft 152 (second fixed portion) fixed to the cover member 130 and engageable with the other of the both ends.

With such a configuration, it is possible to obtain a holding force with a simple configuration.

In addition, the fender support structure 100 includes the first bush 131 (protective member) that is accommodated in the base member 110 and the cover member 130 and that covers the torsion spring 153 from radially outward.

With such a configuration, it is possible to prevent the torsion spring 153 from interfering with other members (such as the cover member 130) and eventually to prevent deformation and damage of the torsion spring 153, the cover member 130, and the like.

In addition, the first fixed shaft 151 and the second fixed shaft 152 are formed in a bar shape substantially parallel to the rotation shaft 120 of the cover member 130, and engage with both of the both ends (upper end 153b and lower end 153c) in a state where the cover member 130 is in the initial position.

With such a configuration, it is possible to obtain a holding force with a simple configuration. That is, even if the front wheel 4 is steered to either the left or the right, the first fixed shaft 151 and the second fixed shaft 152 can engage with any one of both ends of the torsion spring 153 to obtain a holding force. In this manner, the holding force can be obtained by the two fixed portions (the first fixed shaft 151 and the second fixed shaft 152) and the torsion spring 153 irrespective of the steering direction of the front wheel 4.

In addition, the both ends (the upper end 153b and the lower end 153c) are formed so as to protrude radially inward from the main body 153a.

With such a configuration, a high holding force can be easily obtained. That is, by forming both ends inside the main body 153a, the diameter of the main body 153a wound in a coil shape can be easily made large. As a result, the restoring force (holding force) of the torsion spring can be easily secured.

In addition, the regulating mechanism 160 is formed so that with reference to a steering angle of the front wheel 4 in a state where the vehicle body travels straight, the steering angle A1 of the front wheel 4 when a front of the front wheel 4 rotates toward an inside of the vehicle body to regulate the cover member 130 is larger than the steering angle A2 of the front wheel 4 when a rear of the front wheel 4 rotates toward the inside of the vehicle body to regulate the cover member 130.

With such a configuration, the front wheel fender 10 can follow the front wheel 4 more appropriately. That is, since the width of the front of the vehicle body (for example, the hood 7) is normally formed narrower than the width of the rear, the front wheel fender 10 can be brought closer to the vehicle body when the front of the front wheel 4 rotates toward the inside of the vehicle body, as compared with the case when the rear of the front wheel 4 rotates toward the inside of the vehicle body. Therefore, when the front of the front wheel 4 rotates toward the inside of the vehicle body, it is possible to cause the front wheel fender 10 to follow the front wheel 4 in a wide rotation range by regulating the cover member 130 with a larger steering angle.

In addition, the regulating mechanism 160 includes the front regulating portion 162 (first regulating portion) that is fixed to the cover member 130 and that comes into contact with part of a vehicle body to regulate a rotation of the cover member 130 when a front of the front wheel 4 rotates toward the inside of the vehicle body by a predetermined steering angle A1, and the rear regulating portion 164 (second regulating portion) that is fixed to the cover member 130 and that comes into contact with the part to regulate a rotation of the cover member 130 when a rear of the front wheel 4 rotates toward the inside of the vehicle body by a predetermined steering angle A2.

With such a configuration, it is possible to regulate the rotation of the cover member 130 with a simple configuration.

In addition, the regulating mechanism 160 further includes an adjustment mechanism (front nut 161a and rear nut 163a) capable of changing fixed positions of the front regulating portion 162 and the rear regulating portion 164 with respect to the cover member 130.

With such a configuration, the steering angle of the front wheel 4 to which the rotation of the cover member 130 is regulated can be optionally changed. As a result, it is possible to perform setting according to the shape of the vehicle body, the work content, and the preference of the operator.

In addition, the part includes a joint portion (flange 32a) of a case (bevel gear case 32) of a front axle mechanism 30 that transmits power to the front wheel 4.

With such a configuration, it is easy to determine a portion (flange 32a) with which the front regulating portion 162 and the rear regulating portion 164 are in contact. This facilitates adjustment of the positions of the front regulating portion 162 and the rear regulating portion 164.

In addition, the fender support structure 100 is located so that the front regulating portion 162 is located at a position more distant from the flange 32a in a left-right direction than the rear regulating portion 164 is in a state where a steering angle of the front wheel 4 is set to a steering angle at which the vehicle body travels straight.

With such a configuration, the front wheel fender 10 can follow the front wheel 4 more appropriately.

In addition, the tractor 1 (work vehicle) includes the fender support structure 100.

With such a configuration, interference of the front wheel fender 10 accompanying the steering of the front wheel 4 to the left and right can be suppressed.

In addition, the front wheel fender 10 is formed so that the front end of the front wheel fender 10 is located forward of the front end of the front wheel 4 in the front and rear direction.

With such a configuration, it is possible to effectively suppress the mud splashes of the front wheel 4, in particular, the mud splashes at the time of backward traveling.

The base member 110 according to the present embodiment is an embodiment of the first rotation body according to the present invention.

In addition, the front wheel fender 10 according to the present embodiment is an embodiment of the fender according to the present invention.

In addition, the cover member 130 according to the present embodiment is an embodiment of the second rotation body according to the present invention.

In addition, the upper end 153b and the lower end 153c according to the present embodiment are an embodiment of the both ends of the torsion spring according to the present invention.

In addition, the first fixed shaft 151 according to the present embodiment is an embodiment of the first fixed portion according to the present invention.

In addition, the second fixed shaft 152 according to the present embodiment is an embodiment of the second fixed portion according to the present invention.

In addition, the front regulating portion 162 according to the present embodiment is an embodiment of the first regulating portion according to the present invention.

In addition, the rear regulating portion 164 according to the present embodiment is an embodiment of the second regulating portion according to the present invention.

In addition, the front nut 161a and the rear nut 163a according to the present embodiment are an embodiment of the adjustment mechanism according to the present invention.

The flange 32a of the bevel gear case 32 according to the present embodiment is an embodiment of the joint portion of the case of the front axle mechanism according to the present invention.

In addition, the first bush 131 according to the present embodiment is an embodiment of the protective member according to the present invention.

Although an embodiment of the present invention has been described above, the present invention is not limited to the above-described configuration, and various modifications are possible within the scope of the invention described in the claims.

For example, the regulating mechanism 160 is not limited to the configuration of the present embodiment. The present invention is not limited as long as the regulating mechanism can regulate the rotation of the cover member 130 when the steering angle of the front wheel 4 becomes a predetermined value or more in the left direction and the right direction. In addition, the portion with which the front regulating portion 162 and the rear regulating portion 164 are in contact is not limited to the flange 32a of the front axle mechanism 30, and can be optionally set.

In addition, in the present embodiment, using the nuts (the front nut 161a and the rear nut 163a) the fixed positions of the front regulating portion 162 and the rear regulating portion 164 can be changed. The present invention is not limited to this. The fixing position of the front regulating portion 162 and the like can be changed by any methods.

In addition, in the present embodiment, the steering angle A1 is formed so as to be larger than the steering angle A2. However, the present invention is not limited to this. The steering angle A1 and the steering angle A2 can be appropriately set according to the shape of the tractor 1 (the shape of the hood 7) and the like.

Figure 11A:
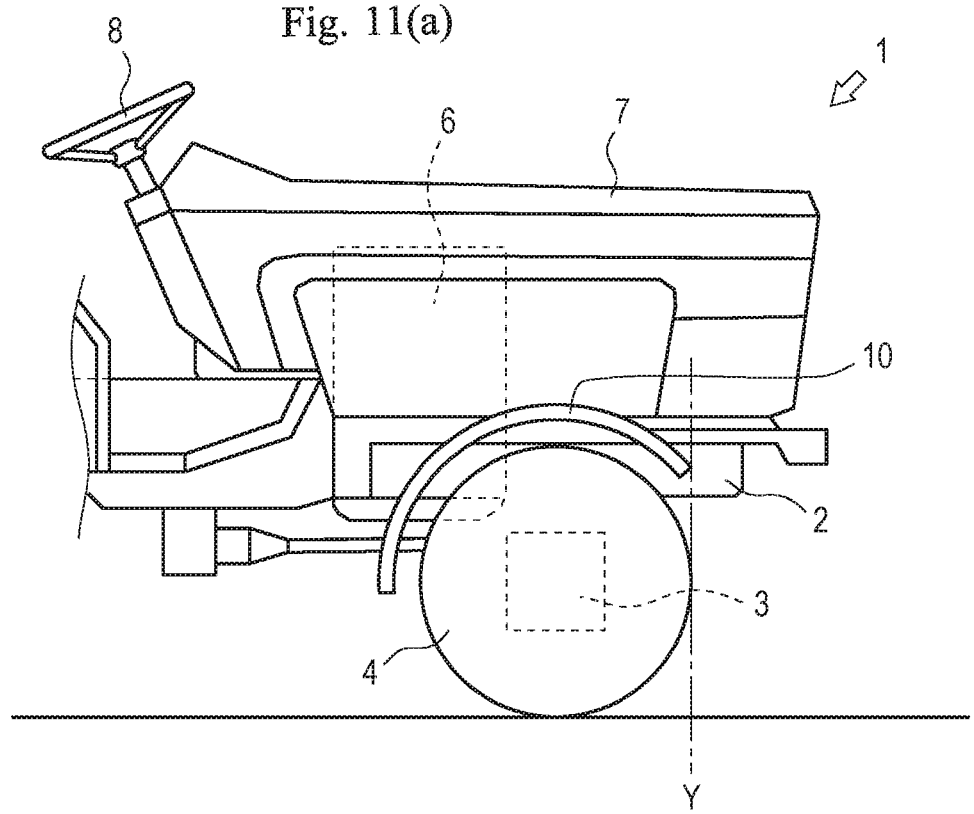
FIG. 11(*a*) is a side view showing a first modification of the front wheel fender.

In addition, in the present embodiment, the front end of the front wheel fender 10 is formed to be located slightly forward of the front end of the front wheel 4 (see FIG. 1). However, the present invention is not limited to this. For example, as in a first modification shown in FIG. 11(a), it is also possible to dispose the front end of the front wheel fender 10 at the same position Y as the front end of the front wheel 4 in the front and rear direction. In this way, by forming the front end of the front wheel fender 10 to be the same as the front end of the front wheel 4 or to be located forward of the front end of the front wheel 4, it is possible to effectively prevent mud splashes caused by the front wheel 4, in particular, the mud splashes at the time of backward traveling.

Figure 11B:
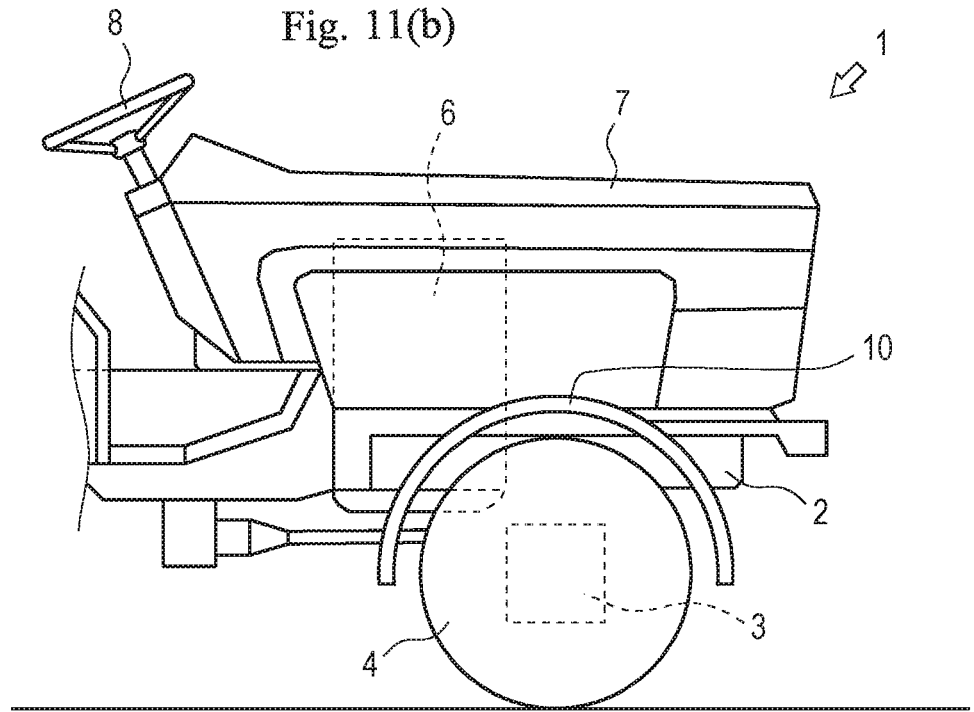

In addition, as in a second modification shown in FIG. 11(b), it is also possible to form the front wheel fender 10 so as to cover a half of the outer periphery of the front wheel 4 or more. More specifically, in side view, it is also possible to form the front wheel fender 10 so as to cover a half of the outer periphery of the front wheel 4 or more (that is, a range of 180 degrees or more around the rotation shaft of the front wheel 4) from the outside. With such a configuration, since it is possible to cover a wide range of the outer periphery of the front wheel 4, it is possible to effectively suppress the mud splashes of the front wheel 4.

In addition, in the present embodiment, the rotation shaft of the front wheel fender 10 (that is, the rotation shaft 120 of the cover member 130) is disposed so as to coincide with the axis of the rotation shaft of the front wheel 4 (that is, the rotation shaft of the front wheel case 33). However, the present invention is not limited to this.

Figure 12C:
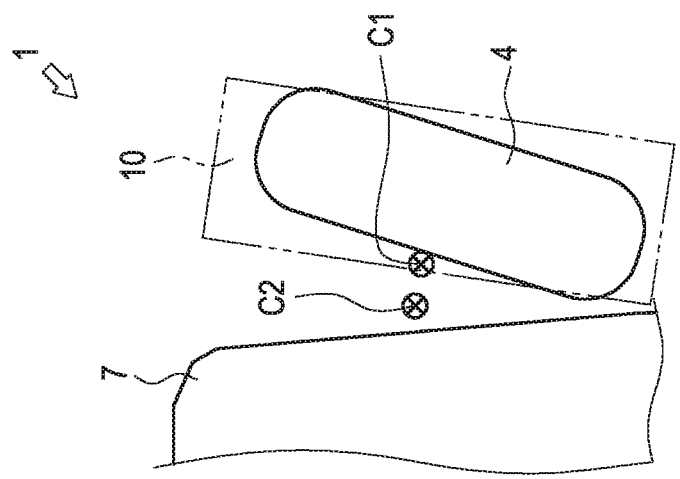
FIG. 12(c) is a schematic plan view showing how the front wheel has been steered to the right.
Figure 12B:
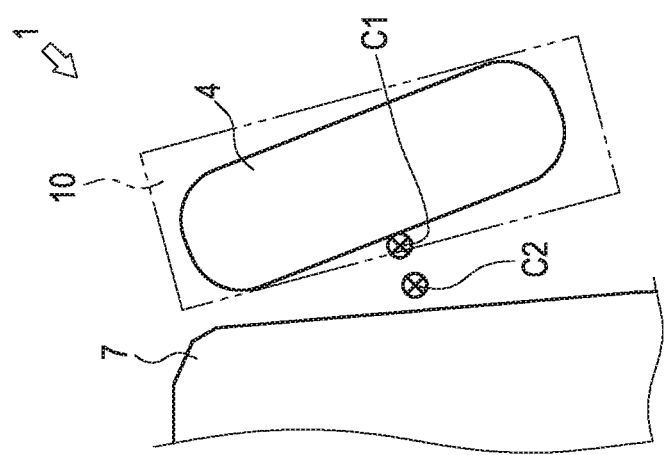
FIG. 12(*a*) is a schematic plan view showing an example in which rotation shafts of the front wheel fender and the front wheel are disposed at different positions.
Figure 12A:
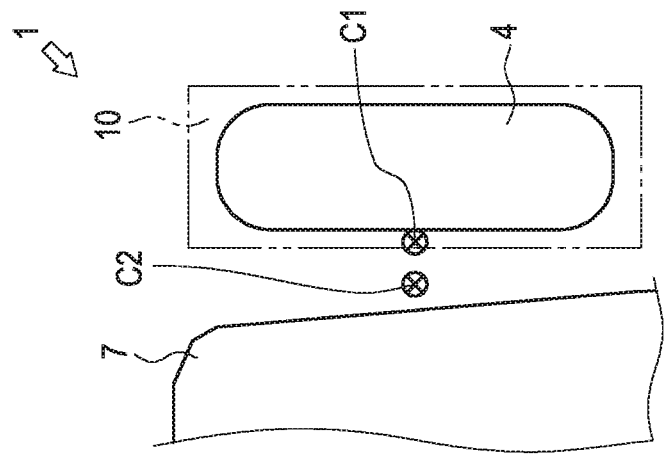

For example, as shown in FIG. 12(a), it is also possible to dispose the rotation shaft (C1 in FIG. 12) of the front wheel fender 10 and the rotation shaft (C2 in FIG. 12) of the front wheel 4 at different positions. Specifically, in the example shown in FIG. 12, the rotation shaft C1 of the front wheel fender 10 is set to be located outward (the front wheel 4 side) of the rotation shaft C2 of the front wheel 4. With such a configuration, as shown in FIGS. 12(b) and 12(c), it is harder for the front wheel fender 10 to interfere with the vehicle body (hood 7 and the like) of the tractor 1. In addition, since the deviation between the front wheel fender 10 and the front wheel 4 is reduced, it is possible to more effectively prevent mud splashes caused by the front wheel 4. From this point of view, it is desirable that the rotation shaft C1 of the front wheel fender 10 be set to a position close to the center in the width direction of the front wheel 4 as much as possible.

Further, in the present embodiment, both ends (the upper end 153b and the lower end 153c) of the torsion spring 153 are formed so as to extend substantially parallel to each other in plan view in a state where the cover member 130 is in the initial position (see FIG. 5). However, the present invention is not limited to this.

Figure 13:
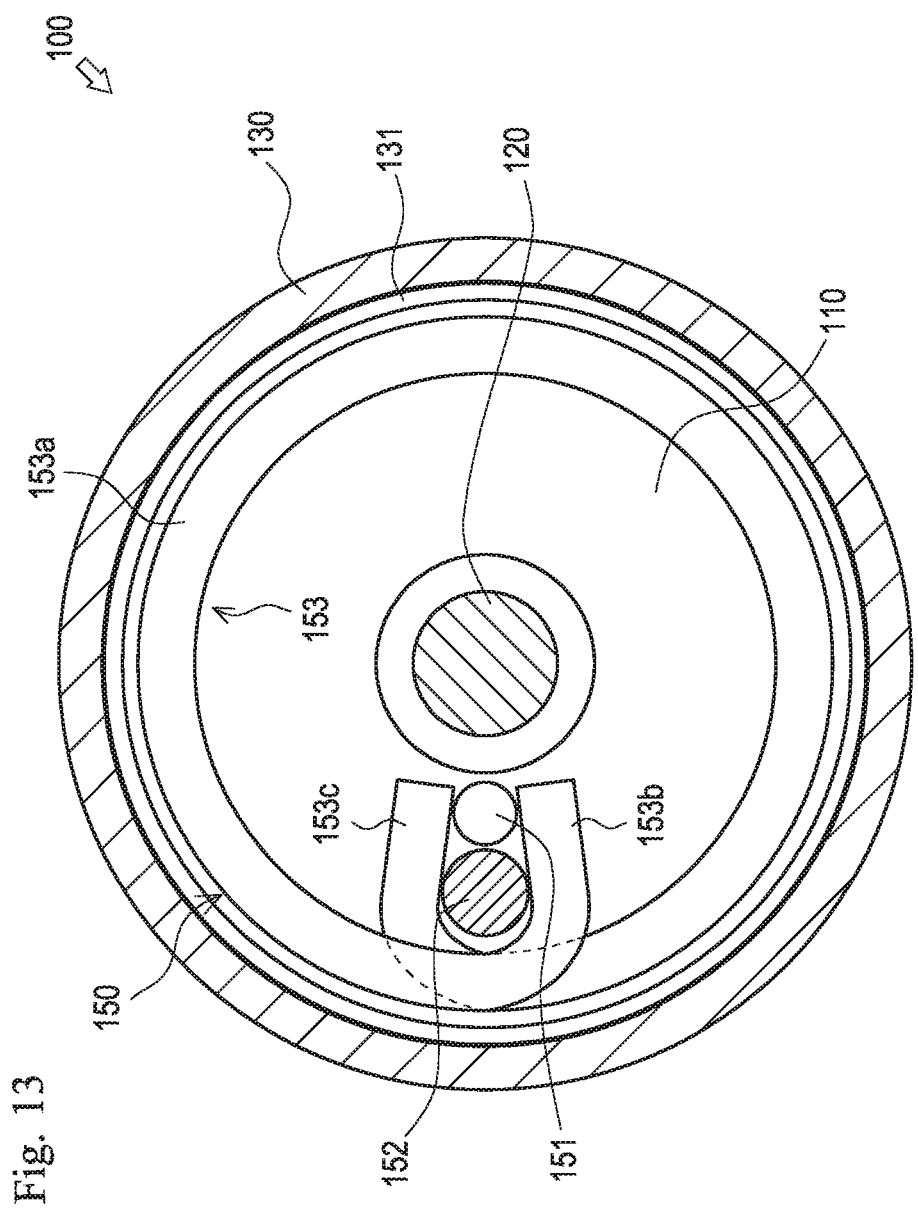
FIG. 13 is a schematic plan cross-sectional view showing a modification of a torsion spring.

For example, as shown in a modification shown in FIG. 13, both ends (the upper end 153b and the lower end 153c) of the torsion spring 153 may be formed so that the gap therebetween is narrow (close to each other) toward the tip (radially inward). By disposing the first fixed shaft 151 and the second fixed shaft 152 in the gap, the first fixed shaft 151 and the second fixed shaft 152 are easily engaged with the both ends (the upper end 153b and the lower end 153c). This makes it possible to prevent unintentional release of engagement of the first fixed shaft 151 and the second fixed shaft 152 with the both ends due to shaking of the vehicle body or the like.

In addition, in this case, the gap between the upper end 153b and the lower end 153c in plan view becomes larger as it goes radially outward. Therefore, in this case, as in the modification shown in FIG. 13, it is preferable to increase the diameter of one of the first fixed shaft 151 and the second fixed shaft 152, which is located radially outward (in the present embodiment, the second fixed shaft 152). That is, in a state where the cover member 130 is in the initial position, it is desirable to appropriately set the diameters of the first fixed shaft 151 and the second fixed shaft 152 so that both of the first fixed shaft 151 and the second fixed shaft 152 are brought into contact with (engaged with) the upper end 153b and the lower end 153c. Thus, it is possible to properly generate a holding force for holding the rotational position of the cover member 130 at the initial position.

As described above, both ends (the upper end 153b and the lower end 153c) of the torsion spring 153 according to the modification are formed so as to be close to each other radially inward in a state where the cover member 130 is in the initial position when viewed from the axial direction of the rotation shaft 120 of the cover member 130, and the first fixed shaft 151 and the second fixed shaft 152 are disposed between the both ends.

With such a configuration, it is easy to engage the first fixed shaft 151 and the second fixed shaft 152 with the both ends.

In addition, the first fixed shaft 151 and the second fixed shaft 152 are formed in a columnar shape extending substantially parallel to the rotation shaft 120 of the cover member 130, and the second fixed shaft 152 (located radially outward) has a diameter larger than the first fixed shaft 151 (located radially inward) of the first fixed shaft 151 and the second fixed shaft 152.

With such a configuration, it is possible to appropriately generate a holding force for holding the rotational position of the cover member 130 at the initial position.

In the above-described embodiment, both ends (the upper end 153b and the lower end 153c) of the torsion spring 153 are located close to each other (a position sandwiching the first fixed shaft 151 and the second fixed shaft 152) in plan view (see FIG. 5). However, the present invention is not limited to this as long as a restoring force (holding force) for returning the cover member 130 to the initial position can be obtained. For example, both ends of the torsion spring 153 may be disposed at positions away from each other (for example, each position is opposite by 180 degrees around the rotation shaft 120).

In addition, the configuration of the holding mechanism 150 is not limited to the above-described embodiment, and any holding mechanism may be used as long as it is possible to generate a holding force to hold the cover member 130 at the initial position. For example, in place of the torsion spring 153, various other biasing members can be used.

In addition, in the above-described embodiment, the tractor 1 is exemplified as the work vehicle. The present invention can be applied to various other work vehicles (agricultural vehicles, construction vehicles, industrial vehicles, etc.).

INDUSTRIAL APPLICABILITY

The present invention can be applied to a fender support structure that supports a fender covering a front wheel, and a work vehicle including the fender support structure.

REFERENCE SIGNS LIST

1: Tractor
4: Front wheel
10: Front wheel fender
30: Front axle mechanism
32: Bevel gear case
32a: Flange
100: Fender support structure
110: Base member
130: Cover member
150: Holding mechanism
151: First fixed shaft
152: Second fixed shaft
153: Torsion spring
153a: Main body
153b: Upper end
153c: Lower end
160: Regulating mechanism
162: Front regulating portion
164: Rear regulating portion

The invention claimed is:

1. A fender support structure comprising:
a first rotation body that rotates in accordance with a steering of a front wheel;
a second rotation body that is relatively rotatable with respect to the first rotation body and that supports a fender covering the front wheel;
a holding mechanism that is accommodated in the first rotation body and the second rotation body and that generates a holding force to hold a relative rotational position of the second rotation body relative to the first rotation body at a predetermined initial position; and
a regulating mechanism that regulates a rotation of the second rotation body in accordance with a steering of the front wheel against the holding force when a steering angle of the front wheel becomes a predetermined value or more in a left direction and a right direction;
wherein the holding mechanism includes:
a torsion spring having a main body wound in a coil shape having an axis substantially parallel to a rotation shaft of the second rotation body and both ends of the torsion spring are formed so as to protrude radially from the main body;
a first fixed portion fixed to the first rotation body and engageable with one of the both ends; and
a second fixed portion fixed to the second rotation body and engageable with the other of the both ends; and
wherein the both ends are formed so as to protrude radially inward from the main body.

2. The fender support structure according to claim 1, further comprising a seal member that seals between the first rotation body and the second rotation body.

3. The fender support structure according to claim 1, wherein the second rotation body is disposed so as to cover the first rotation body from above and lateral side.

4. The fender support structure according to claim 1, further comprising a protective member that is accommodated in the first rotation body and the second rotation body and that covers the torsion spring from radially outward.

5. The fender support structure according to claim 1, wherein the first fixed portion and the second fixed portion are formed in a bar shape substantially parallel to the rotation shaft of the second rotation body, and engage with both of the both ends in a state where the second rotation body is in the initial position.

6. The fender support structure according to claim 5, wherein the both ends are formed so that a gap between the both ends becomes narrow to each other radially inward in a state where the second rotation body is in the initial position when viewed from a axial direction of the rotation shaft of the second rotation body, and wherein the first fixed portion and the second fixed portion are disposed in the gap.

7. The fender support structure according to claim 6,
wherein a diameter of one of the first fixed portion and the second fixed portion, which is located radially outward, is larger than a diameter of the other of the first fixed portion and the second fixed portion, which is located radially inward.

8. A work vehicle comprising the fender support structure according to claim 7.

9. The work vehicle according to claim 8,
wherein the fender is formed so that a front end of the fender is disposed at a position identical to a front end of the front wheel, or forward of the front end of the front wheel in the front and rear direction.

10. The work vehicle according to claim 8,
wherein the fender is formed so as to cover a half of an outer periphery of the front wheel or more.

11. The fender support structure according to claim 1,
wherein the both ends are formed so that a gap between the both ends becomes narrow to each other radially inward in a state where the second rotation body is in the initial position when viewed from a axial direction of the rotation shaft of the second rotation body, and
wherein the first fixed portion and the second fixed portion are disposed in the gap.

12. The fender support structure according to claim 11,
wherein the first fixed portion and the second fixed portion are formed in a columnar shape extending substantially parallel to the rotation shaft of the second rotation body, and
wherein a diameter of one of the first fixed portion and the second fixed portion, which is located radially outward, is larger than a diameter of the other of the first fixed portion and the second fixed portion, which is located radially inward.

13. The fender support structure according to claim 1,
wherein the regulating mechanism is formed so that with reference to a steering angle of the front wheel in a state where a vehicle body travels straight, a steering angle of the front wheel when a front of the front wheel rotates toward an inside of the vehicle body to regulate the second rotation body is larger than a steering angle of the front wheel when a rear of the front wheel rotates toward the inside of the vehicle body to regulate the second rotation body.

14. The fender support structure according to claim 1,
wherein the regulating mechanism comprises:
a first regulating portion that is fixed to the second rotation body and that comes into contact with part of the vehicle body when the front of the front wheel rotates toward the inside of the vehicle body by a predetermined steering angle to regulate a rotation of the second rotation body, and
a second regulating portion that is fixed to the second rotation body and that comes into contact with the part when the rear of the front wheel rotates toward the inside of the vehicle body by a predetermined steering angle to regulate a rotation of the second rotation body.

15. The fender support structure according to claim 14,
wherein the regulating mechanism further includes an adjustment mechanism capable of changing fixed positions of the first regulating portion and the second regulating portion with respect to the second rotation body.

16. The fender support structure according to claim 14,
wherein the part is a joint portion of a case of a front axle mechanism that transmits power to the front wheel.

17. The fender support structure according to claim 14,
wherein, in a state where a steering angle of the front wheel is set to a steering angle at which the vehicle body travels straight, the first regulating portion is located at a position more distant from the part in a left-right direction than the second regulating portion is.

* * * * *